United States Patent [19]
Matsubara et al.

[11] Patent Number: 5,430,699
[45] Date of Patent: Jul. 4, 1995

[54] OPTICAL READING AND WRITING DEVICE

[75] Inventors: Akira Matsubara, Kameoka; Takao Hayashi, Katano; Yutaka Murakami, Katano; Toru Nakamura, Katano; Hideki Aiko, Osaka, all of Japan

[73] Assignee: Matsushita Electric Industrial Co., Ltd., Osaka, Japan

[21] Appl. No.: 200,456

[22] Filed: Feb. 23, 1994

[30] Foreign Application Priority Data

Feb. 24, 1993 [JP] Japan .................................. 5-035106
Mar. 12, 1993 [JP] Japan .................................. 5-051925

[51] Int. Cl.⁶ .............................................. G11B 7/00
[52] U.S. Cl. ................................... 369/44.32; 369/54
[58] Field of Search ............ 369/54, 58, 44.32, 44.14, 369/44.11, 44.17, 44.18, 44.19, 44.21, 44.22; 250/201.1

[56] References Cited
U.S. PATENT DOCUMENTS

| | | | |
|---|---|---|---|
| 4,634,853 | 1/1987 | Kanamaru | 369/44.32 |
| 4,780,865 | 10/1988 | Yamakawa | 369/44.32 |
| 4,956,833 | 9/1990 | Kokado et al. | 369/54 |
| 5,051,975 | 9/1991 | Tadokoro et al. | 369/44.32 |
| 5,218,597 | 6/1993 | Yabe | 369/118 |
| 5,301,175 | 4/1994 | Nakamura | 369/44.32 |

FOREIGN PATENT DOCUMENTS 60-135817 9/1985 Japan .
03137831 6/1991 Japan .................. 369/44.32

Primary Examiner—Georgia Y. Epps
Assistant Examiner—P. W. Huber
Attorney, Agent, or Firm—Wenderoth, Lind & Ponack

[57] ABSTRACT

The relative tilt of an optical disk and a movable objective lens holder is measured as an output of a differential amplifier which subtracts an output of first photodetectors and which detect the reflected light from optical disk from an output of second photodetectors and which detect the reflected light from a reflector mounted on movable objective lens holder. The signal from differential amplifier is used to tilt movable objective lens holder so that the movable objective lens holder compensates the tilt of optical disk.

11 Claims, 15 Drawing Sheets

OPTICAL READING AND WRITING DEVICE

BACKGROUND OF THE INVENTION

1. Field of the Invention

The present invention relates to an optical reading and writing device for use in CD players, video disk players, and so on.

2. Description of the Prior Art

When information is written on or read from an optical disk such as a video disk by means of an optical reading and writing device, the quality of writing or reading signals is degraded when the optical disk is warped or bent cambered at its outer circumference. The conventional methods to compensate the signal degradation due to the tilt of the optical disk are to detect the tilt of the optical disk by means of a tilt sensor and then tilt the whole optical reading and writing device using the detected tilt signal.

One example of an optical reading and writing device having a tilt sensor is described in U.S. Pat. No. 5,218,597. In such a conventional scheme, however, since a sensor is mounted on a main body frame of the optical reading and writing device, a measured value is a relative tilt of an optical disk with respect to the main body frame. Therefore, compensation of the tilt of the optical disk is made by tilting the whole optical reading and writing device. Optical reading and writing devices having this kind of scheme, therefore, must have a heavy mechanism to tilt itself and must be necessarily large.

Another example for a conventional optical reading and writing device is explained below. In this example the drawback of the first example was resolved by tilting only an objective lens to compensate signal degradation due to a tilt of an optical disk. One example of this type of optical reading and writing device is described in Japanese Utility Model Laid Open Publication No. 60-135817. In this scheme a relative tilt of an optical disk with respect to an objective lens must be detected. A method to measure the relative tilt is, as described in Japanese Utility Model Laid Open Publication No. 60-135817, to mount a light source and photo detectors on a movable objective lens holder.

In this conventional scheme, however, the movable objective lens holder carries additional masses of the light source and photodetectors. Further, wirings to supply an electric power to the light source and to receive output signals from the photodetecors degrades the drivability of the objective lens.

SUMMARY OF THE INVENTION

An objective of the present invention is, therefore, to present an optical reading and writing device which eliminates the drawbacks mentioned above. That is, the optical reading and writing device of this invention has a light movable objective lens holder and detects a relative tilt of an optical disk with respect to the movable objective lens holder, and the tilt signal is used to tilt the movable objective lens so as to compensate degradation of read/write signals caused by the tilt of the optical disk.

In order to achieve the object of the present invention, there is provided an optical reading and writing device of an optical disk apparatus comprising a first tilt sensor for detecting a tilt of an optical disk relative to a mount member on which the first tilt sensor is arranged, a second tilt sensor for detecting a tilt of an objective lens holder relative to the mount member on which the second tilt sensor is also arranged and a control means for controlling the tilt of the objective lens holder in accordance with output signals from the first and second tilt sensors whereby the tilt of the optical disk is compensated by tilting the lens holder so that a relative tilt between the optical disk and the objective lens can be kept constant. The device according to the present invention detects the relative tilt of the optical disk with respect to the movable objective lens holder by measuring the difference between the outputs of the two pair of segmented photodetectors. The detected tilt signal is used to tilt the objective lens so as to compensate the tilt of the optical disk.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENTS

EMBODIMENT 1

Figure 1:
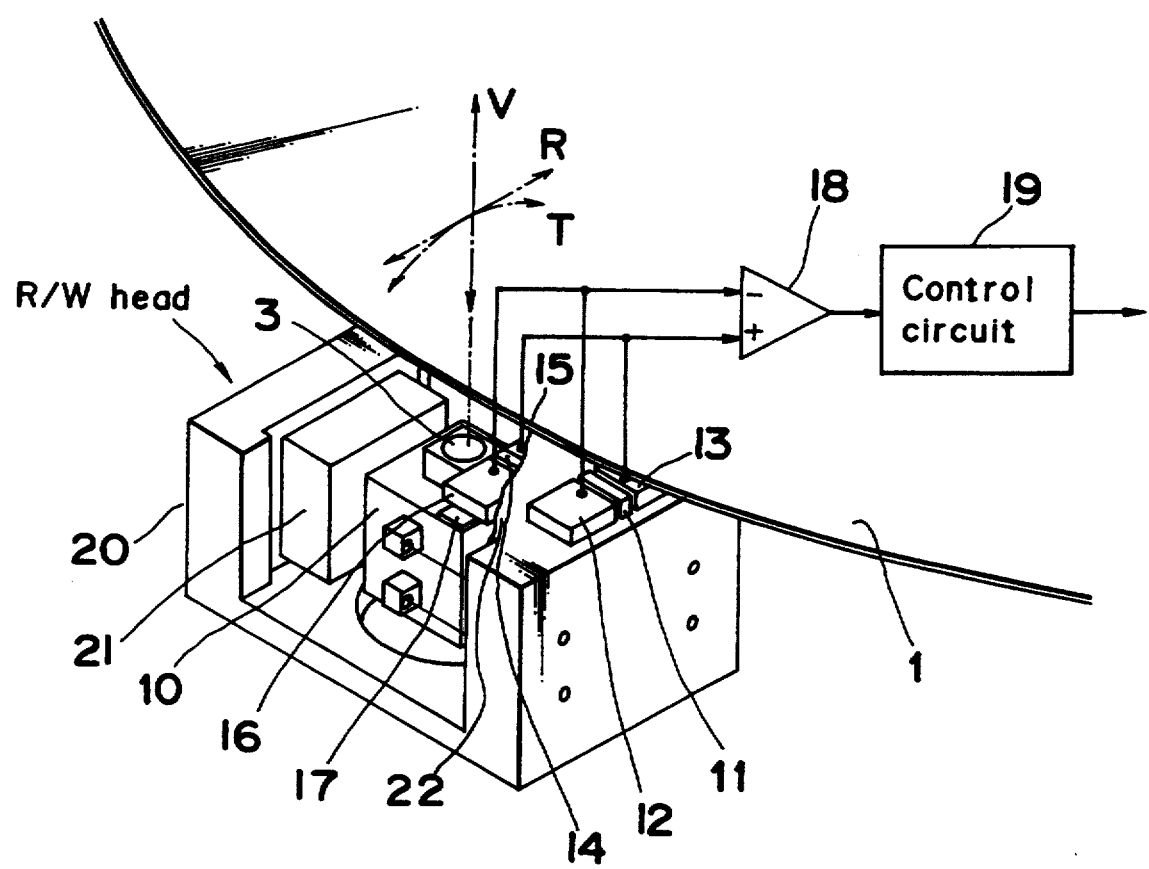
FIG. 1 is a perspective view of an optical reading and writing device according to embodiment 1 of the present invention.

FIG. 1 shows a perspective view of an optical reading and writing device according to embodiment 1 of the present invention. In the figure reference numeral 1 denotes an optical disk, 3 an objective lens, and 10 a movable objective lens holder which has three degrees of freedom as indicated by phantom arrow lines V, R and T, namely, translational motion in a direction V perpendicular to the optical disk, translational motion in a radial direction R of the optical disk, and tilt motion in a direction T parallel to a plane including directions V and R. The three components form important part of the optical reading and writing device to read and write information on the optical disk.

The lens holder 10 is arranged between a pair of permanent magnets 21 (only one of them is shown in FIG. 1) which are supported by a main body 20 of the optical R/W head. As is well known to those skilled in the art, the optical R/W head is controlled so as to perform an access motion relative to the optical disk by a driving mechanism (not shown) and the position and attribute of the lens holder 10 relative to the optical disk is controlled by a method utilizing electro-magnetic forces generated by applying a control current to a plurality of electro-magnetic coils arranged in a magnetic field generated by the pair of permanent magnets (See 21 of FIG. 1).

Figure 2:
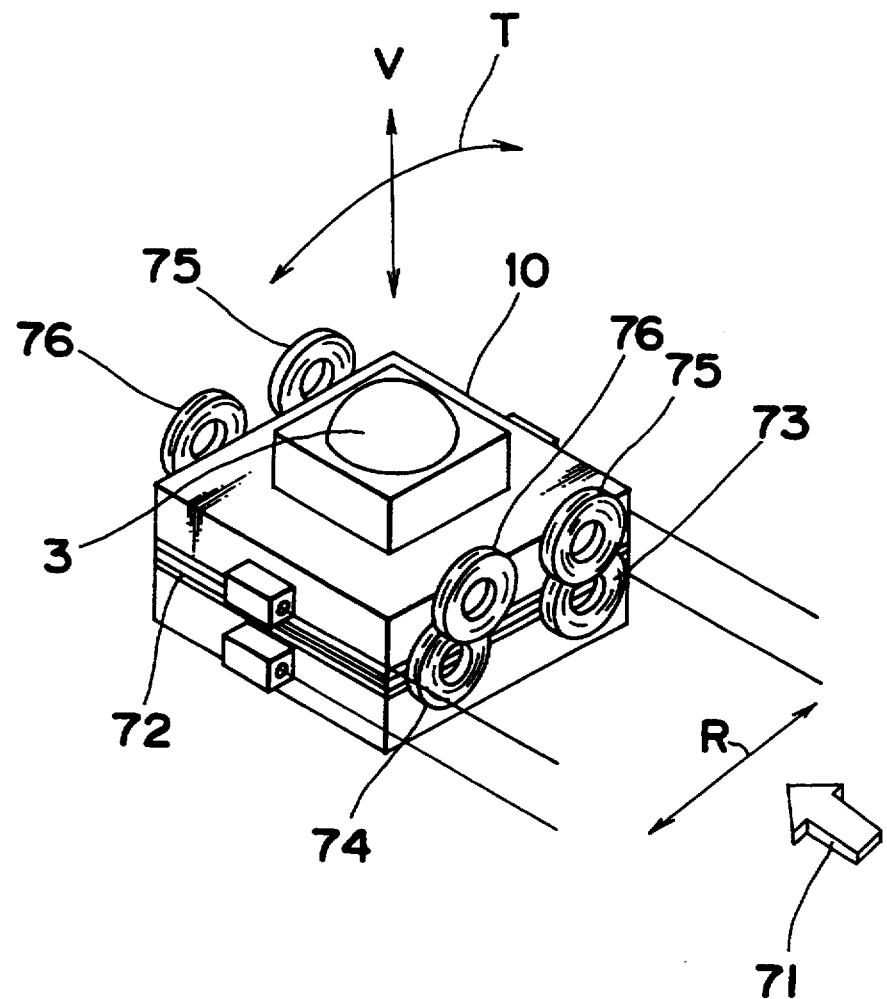
FIG. 2 is a perspective view of a lens holder of the optical reading and writing device for showing a drive mechanism thereof.

A drive mechanism employing the above method is disclosed, for instance, in a Japanese patent laid open publication No. HEI 4-301234, and illustrated in FIG. 2 schematically.

As shown in FIG. 2, the lens holder 10 has a focus coil 72 wound around side walls thereof, a pair of tracking coils 73 and 74 and a pair of tilt coils 75 and 76 mounted on each side wall thereof perpendicularly to a static magnetic field as indicated by an arrow 71 generated by the pair of permanent magnets 21 of FIG. 1. The focus coil 72 generates a drive force for focusing the objective lens 3 in the vertical direction V according to the magnitude and direction of a current applied thereto. The pair of tracking coils 73 and 74 generate a drive force for the translational movement in the direction R and the pair of tilt coils 75 and 76 generate a drive force for tilting the lens holder in the direction T, according to the magnitude and direction of a current applied thereto, respectively.

Referring to FIG. 1 again, according to the embodiment of the present invention, there is provided a servo-control system for controlling the tilt attribute of the lens holder 10 to maintain or guarantee the perpendicularity of an optical axis of the objective lens 3 to the optical disk 1 or the parallelism between the objective lens 3 and the optical disk 1.

The servo-control system comprises a first tilt sensor (11, 12 and 13) for detecting a tilt amount of the optical disk 1 and a second tilt sensor (14, 15 and 16) for detecting a tilt amount of the lens holder 10. The first tilt sensor (11, 12 and 13) is arranged or mounted on an upper surface of one side wall of the main body 20 of the optical R/W head and the second tilt sensor (15, 16 and 17) is arranged on an under surface of an upper wall 22 formed inwardly from the upper portion of the side wall of the main body 20. The first tilt sensor (11, 12 and 13) is comprised of a light emitting device 11 for emitting light toward the optical disk 1 and a pair of photodiodes 12 and 13 arranged on both sides of the light emitting device 11 in the radial direction R so as to detect a tilt amount of the optical disk 1 based on output signals therefrom.

The second tilt sensor (14, 15 and 16) is comprised of a light emitting device 14 for emitting light toward a reflection plate 17 arranged on an upper surface of the lens holder 10 and a pair of photodiodes 15 and 16 arraged on both sides of the light emitting device 14 in the radial direction R so as to detect a tilt amount of the lens holder 10 based on output signals therefrom. Output signals from inside photodiodes 13 and 15 are input to one of input terminals of a differential amplifier 18 and those from outside photodiodes 14 and 16 are input to another input terminal of the differential amplifier 18. The differential amplifier 18 outputs an output signal proportional to a difference between signals input to the two terminals thereof and this output signal is input to a control circuit 19 for controlling the tilt amount of the lens holder 10 to maintain the perpendicularity to the optical disk 1.

Figure 3:
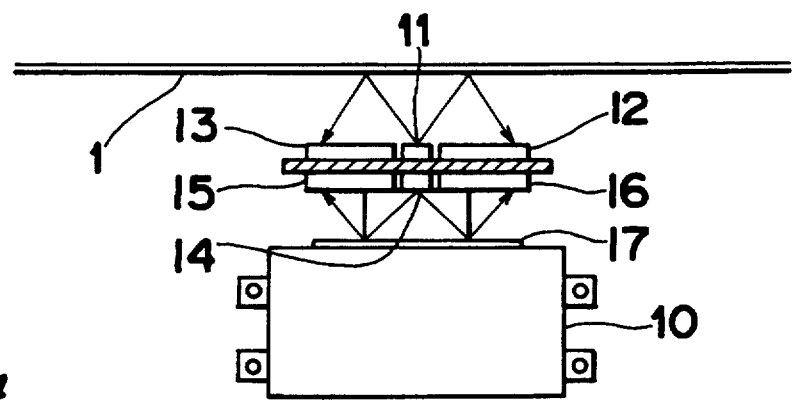
FIGS. 3, 4 and 5 are side views for showing relative tilt states between an optical disk and a lens holder of the optical reading and writing device according to embodiment 1, respectively.
Figure 4:
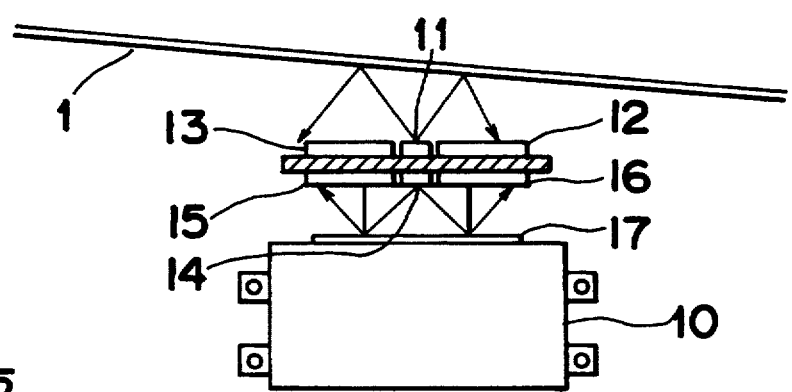
Figure 5:
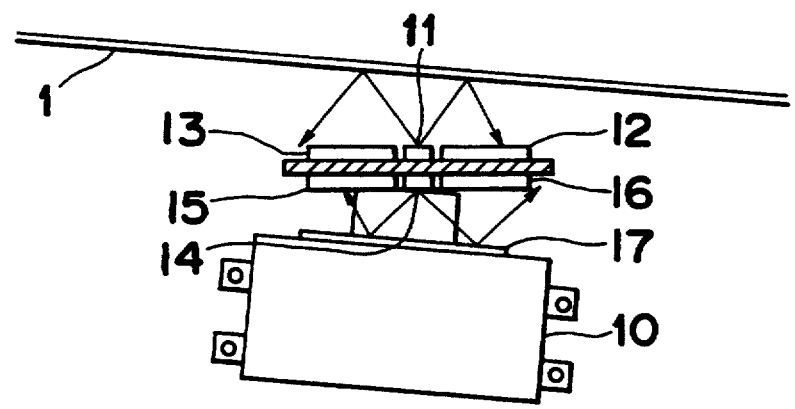

FIGS. 3, 4 and 5 are side views for showing relative tilt states between the optical disk 1 and the lens holder 2, respectively.

FIG. 3 shows a case in that neither the optical disk 1 nor the lens holder 10 has a tilt with respect to the main body frame 20 of the R/W head. As indicated by arrows in FIG. 3, amounts of lights reflected by the optical disk 1 and received by two photodiodes 12 and 13 of the first tilt sensor are equal to each other and those reflected by the reflection means 17 on the lens holder 10 and received by two photodiodes 15 and 16 of the second tilt sensor are also equal to each other. Thus, an output from the differential amplifier 18 is zero and this indicates no relative tilt between the optical disk 1 and the lens holder exists.

FIG. 4 shows a case in that the optical disk 1 has a tilt with respect the main body frame 20 of the R/W head while the lens holder 10 does not. In the case shown therein, the light amount received by the photodiode 12 increases while that received by another photodiode 13 decreases by the same amount. The light amounts received by two photodiodes 15 and 16 are still equal to each other. Thus, the differential output from the differential amplifier 18 becomes positive in accordance with a difference between outputs from two photodiodes 12 and 13 (output of 12—output of 13).

FIG. 5 shows a case in that both optical disk 1 and lens holder 10 have the same amount of tilts in the same direction.

Figure 7:
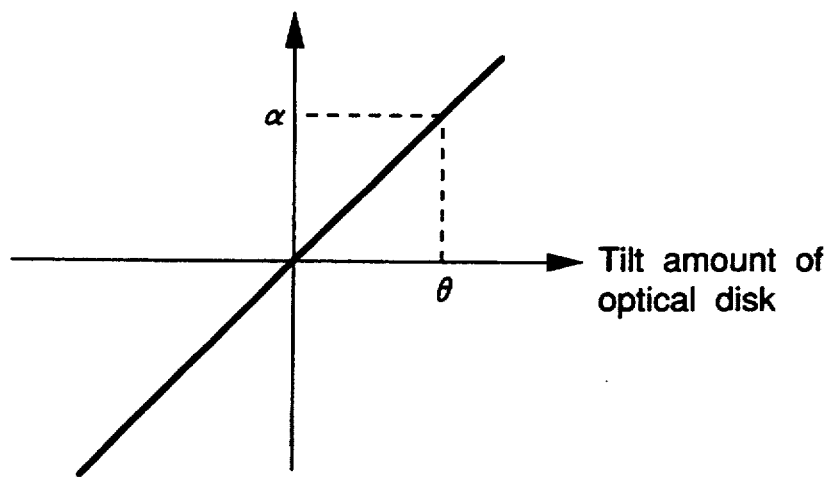
FIG. 7 is a graph showing the relationship between the tilt of the optical disk and a difference between outputs of the photodetectors 12 and 13 in embodiment 1.
Figure 8:
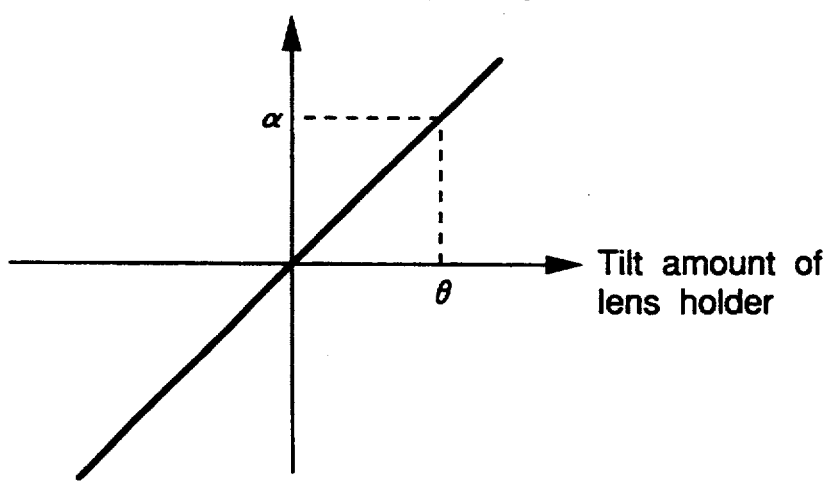
FIG. 8 is a graph showing the relationship between the tilt of the lens holder and a difference between outputs of the photodetectors 15 and 16 in embodiment 1.

In this case, light amounts received by two photodiodes 12 and 13 of the first tilt sensor are different from each other and those received by two photodiodes 15 and 16 of the second tilt sensor are also different from each other. However, the differential output from the differential amplifier 18 becomes zero as far as the reflectance of the optical disk 1 is equal to that of the refection means 17 and all photodiodes have the same output property, as shown in FIGS. 7 and 8, respectively.

As is apparent from these figures, the parallelism or perpendicularity between the optical disk 1 and the lens holder 10 can be maintained when the differential output of the differential amplifier 18 is zero. In other words, the control circuit 19 controls the current to be applied to tilt coils (See FIG. 2) so that the output of the differential amplifier 18 becomes zero.

Figure 6:
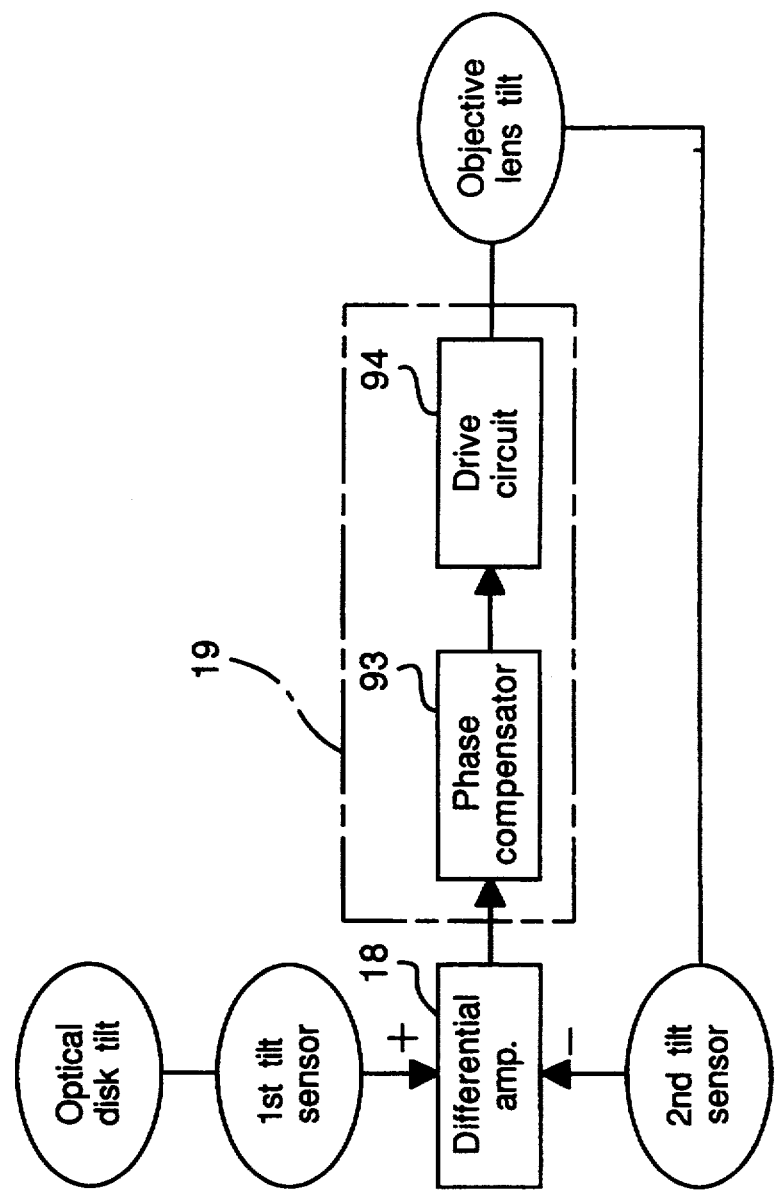
FIG. 6 is a block diagram of a control circuit of the optical reading and writing device according to embodiment 1.

FIG. 6 is a block diagram of the control circuit 19 comprising a phase compensator 93 and a drive circuit 94. An output of the differential amplifier 18 is input to the phase compensator 93 and an output of the phase compensator 93 is input to the drive circuit 84. The drive circuit 94 generates a control current according to the input signal and applies the same to tilt coils, thereby controlling the tilt amount of the lens holder 10 becomes equal to that of the optical disk 1. Thus, the first and second tilt sensors, the differential amplifier 18 and control circuit 19 form a feed-back control system for following the lens holder 10 to a tilt of the optical disk 1.

Figure 9:
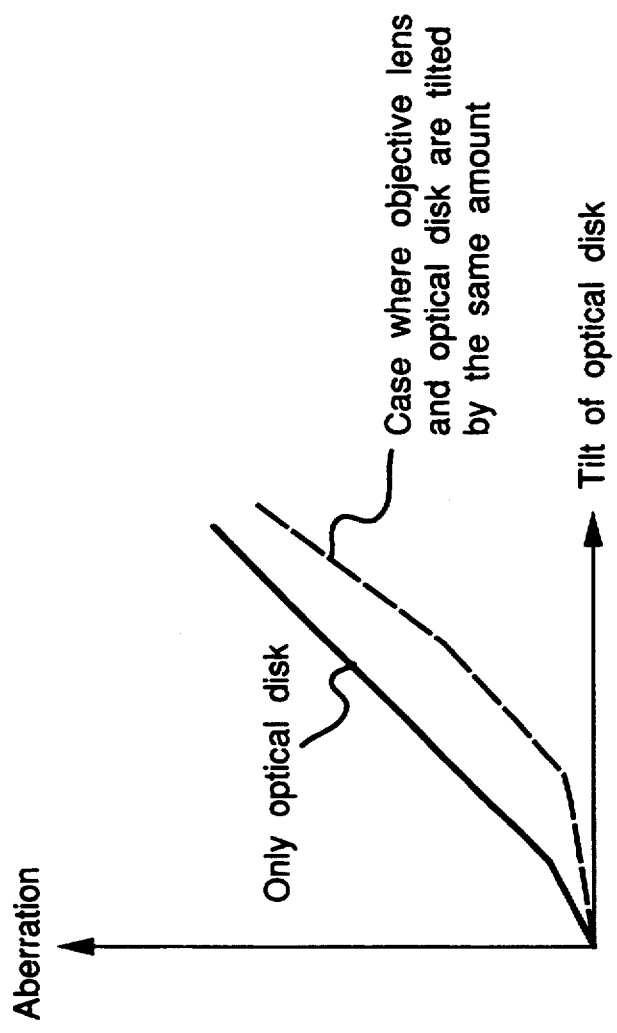
FIG. 9 is a graph showing the relationship between the tilt of the optical disk and the aberration of an objective lens caused thereby in embodiment 1.

FIG. 9 shows the effect of compensation of a tilt of optical disk 1 by tilting movable objective lens holder 10. The ordinate is the aberration which is a measure of the degradation of optical reading performance. The solid line in FIG. 9 shows the aberration when only optical disk 1 is tilted. The aberration is proportional to the tilt of optical disk 1 in the region where the tilt is large. The broken line in FIG. 9 shows the relationship between the aberration and the tilt of optical disk 1 when the tilt of lens holder 10 is made equal to the tilt of optical disk 1. The aberration for the case in which the tilts of optical disk 1 and lens holder 10 are made equal is less than the case in which only optical disk 1 has a tilt. This clearly shows that compensation of the tilt of optical disk 1 is achieved by tilting objective lens 3 so that it's tilt is made equal to the tilt of optical disk 1.

EMBODIMENT 2

The difference of this embodiment from embodiment 1 is that the optical reading and writing device in this embodiment has reflector 17 shown in FIG. 1 of which reflectance is different from the reflectance of optical disk 1.

Figure 10:
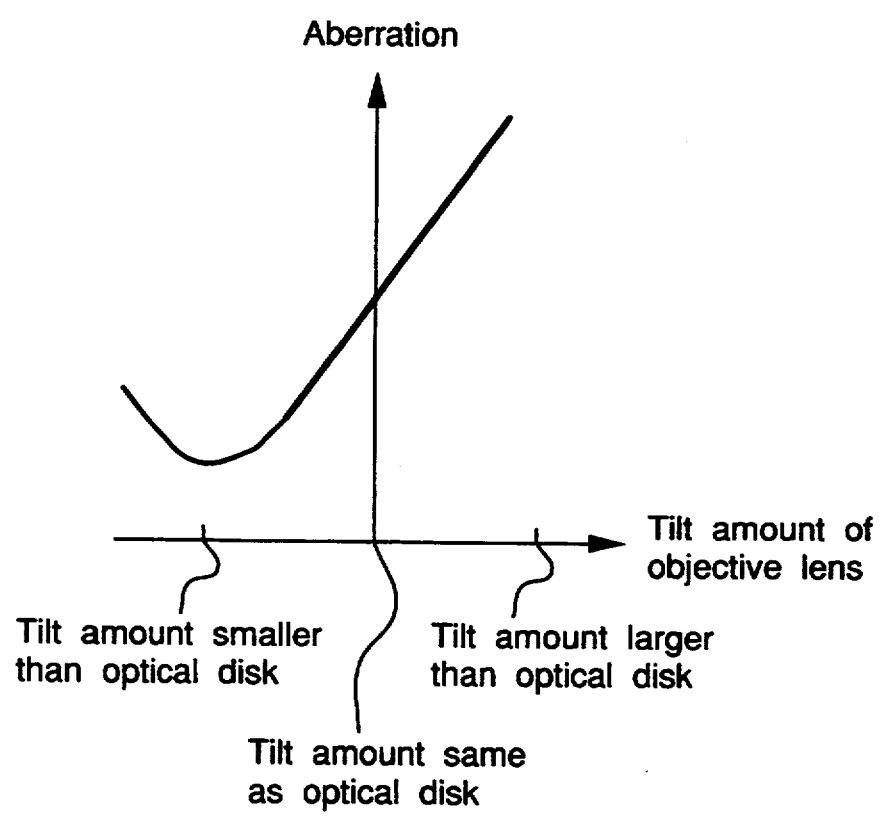
FIG. 10 is a graph showing the relationship between the tilt of the lens holder and the aberration of an objective lens caused thereby in embodiment 2 of the present invention.

FIG. 10 shows the relationship between the aberration and the tilt of lens holder 10 when optical disk 1 has a certain tilt. FIG. 10 illustrates that smaller aberration is obtained when lens holder 10 is set at less tilt than that of optical disk 1. This fact indicates that an accurate control device for an optical reading and writing device is constructed by making the tilt of objective lens 3 to be less than a given tilt of optical disk 1 by a certain factor. This situation is realized by using reflector 17 mounted on lens holder 10, of which reflectance is higher than that of optical disk 1.

Figure 11:
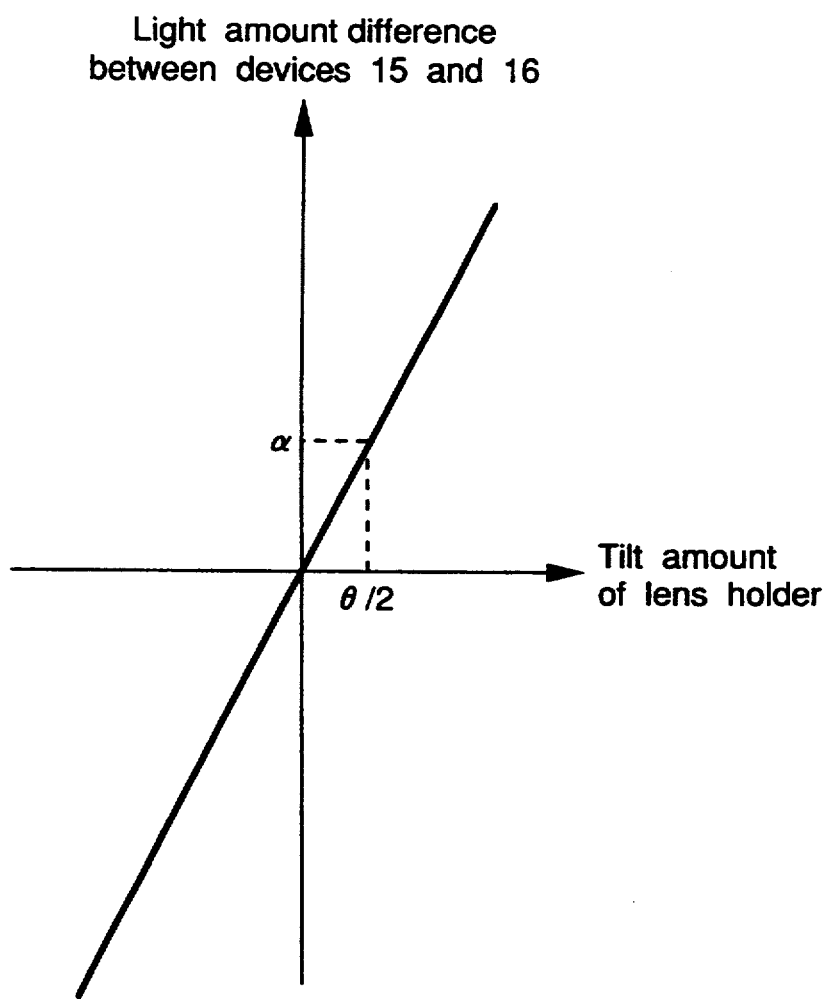
FIG. 11 is a graph showing the relationship between the tilt of the lens holder and a difference between outputs of the photodetectors in embodiment 2 of the present invention.

FIG. 11 shows in the same scale as in FIG. 8 the relationship between the tilt of lens holder 10 having reflector 17 which has a reflectance twice as much as that of optical disk 1 and the difference output from photodiodes 15 and 16. When optical disk 1 has a tilt of and the difference output (Output of 12—Output of 13) of the first photodetectors is $\alpha$ with reference to FIG. 8, the tilt of movable objective lens holder 10 becomes $\theta/2$ when the difference output (Output of 15—Output of 16) of the second tilt sensor is $\alpha$. Thus using a reflector having a higher reflectance than that of optical disk 1 a tilt of optical disk 1 is compensated by tilting lens holder 10 by an amount which is a constant factor less than the tilt of optical disk 1.

Thus constructed is an optical reading and writing device which easily detects the relative tilt between optical disk 1 and lens holder 10 using first tilt sensor (11, 12 and 13), second tilt sensor (14, 15 and 16), and reflector 17 having a higher reflectance than optical disk 1, and which compensates the tilt of optical disk 1 by objective lens holder 10 by an amount which is a constant factor less than the tilt of optical disk 1.

EMBODIMENT 3

Figure 12:
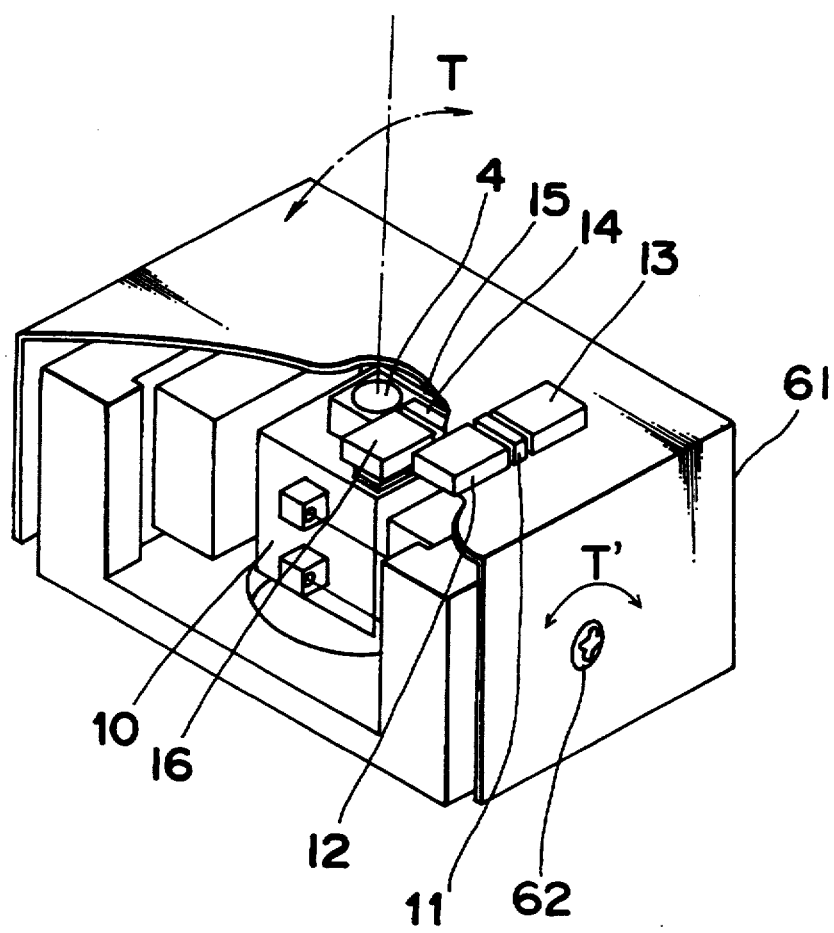
FIG. 12 is a partially cut off perspective view of an optical reading and writing device according to embodiment 3 of the present invention.

FIG. 12 shows a partially cut perspective view of a tilt detection device for an optical disk in embodiment 3. The difference from embodiments 1 and 2 is that first and second tilt sensors (11, 12 and 13) and (14, 15 and 16) are all mounted on an objective lens cover 61 which encloses lens holder 10.

A typical optical reading and writing device is equipped with a cover which prevents movable objective lens holder 10 from flying out. First tilt sensor (11, 12 and 13) is arranged on cover 61 with their active faces up, while second tilt sensor (14, 15 adn 16) is arranged on the under surface of cover 61 with their active faces down. This structure not only provides the same effect of the embodiment 1 but prevents movable objective lens holder 10 from flying out as well.

A screw 62 holds cover, which can be displaced, relative to screw 62, up and down, and left and right, and can be tilted in the same direction as lens holder 10 is tilted. In FIG. 12 the broken arrows T show directions in which lens holder 10 is tilted and the solid arrows T' show the direction in which cover 61 is tilted for adjustment. In the assembly process cover 61 may be tilted about screw 62 in the same direction of the tilt of optical disk 1 so that the initial tilt signal be zero. An optical reading and writing device is thus constructed, which has light sources and photodetectors placed on cover 61, detects the relative tilt between optical disk 1 and lens holder 10 on the same principle as that in embodiment 1, and prevents lens holder 10 from flying out. Further, the initial tilt of optical disk 1 is compensated by tilting cover 61 about screw 62 which holds cover 61.

EMBODIMENT 4

Figure 13:
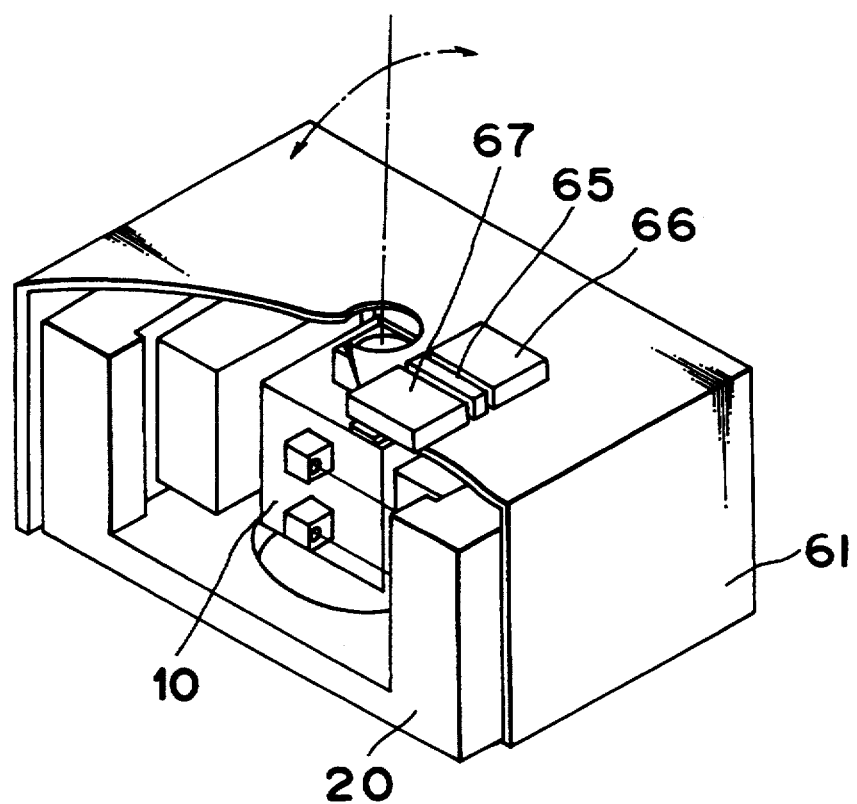
FIG. 13 is a partially cut off perspective view of an optical reading and writing device according to embodiment 4 of the present invention.
Figure 14:
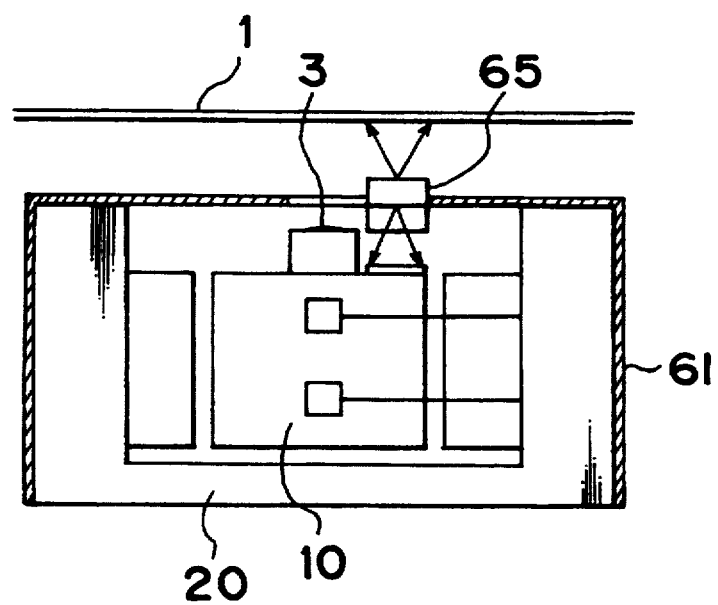
FIG. 14 is a cross-sectional view of the optical reading and writing device shown in FIG. 13.

FIG. 13 shows a partially cut off perspective view of a tilt detection device for an optical disk in embodiment 4 and FIG. 14 is a cross-section view of the R/W head shown in FIG. 13. In these figures reference numeral 65 denotes bidirectional light emitting diode which emits light rays toward optical disk 1 from the top face and toward lens holder 10 from the bottom face. Reference numerals 66 and 67 denote double-sided photodetectors which detects with the top face the light rays emitted from the top face of bidirectional LED 65 and then reflected from optical disk 1 and with the bottom face the light rays emitted from the bottom face of bidirectional LED 65 and then reflected from lens holder 10.

The bidirectional LED is now supplied to the market, for instance, in the name of LN59 ®. As the double-sided photodetectors, photodetectors, those disclosed in, for instance U.S. Pat. No. 5,218,577, are available. In U.S. Pat. No. 5,218,577, there is disclosed a single backage of photodetector formed by growing an N layer and a P layer on both sides of a single silicon chip.

The difference between the outputs from two-face photodetectors 66 and 67 represents the difference between the tilts of optical disk 1 and movable objective lens holder 10. This simple structure enables to detect the relative tilt between optical disk 1 and movable objective lens holder 10.

Use of bidirectional light source 65 which emits light rays toward optical disk 1 as well as lens holder 10 and double-faces photodetectors 66 and 67 allows the detection of the relative tilt between optical disk 1 and lens holder 10 to be made in a simple structure, and reduces the component count for an optical reading and writing device. Since the tilts are detected with a single light source, the initial tilt becomes less and reliability of the device improves.

EMBODIMENT 5

Figure 15:
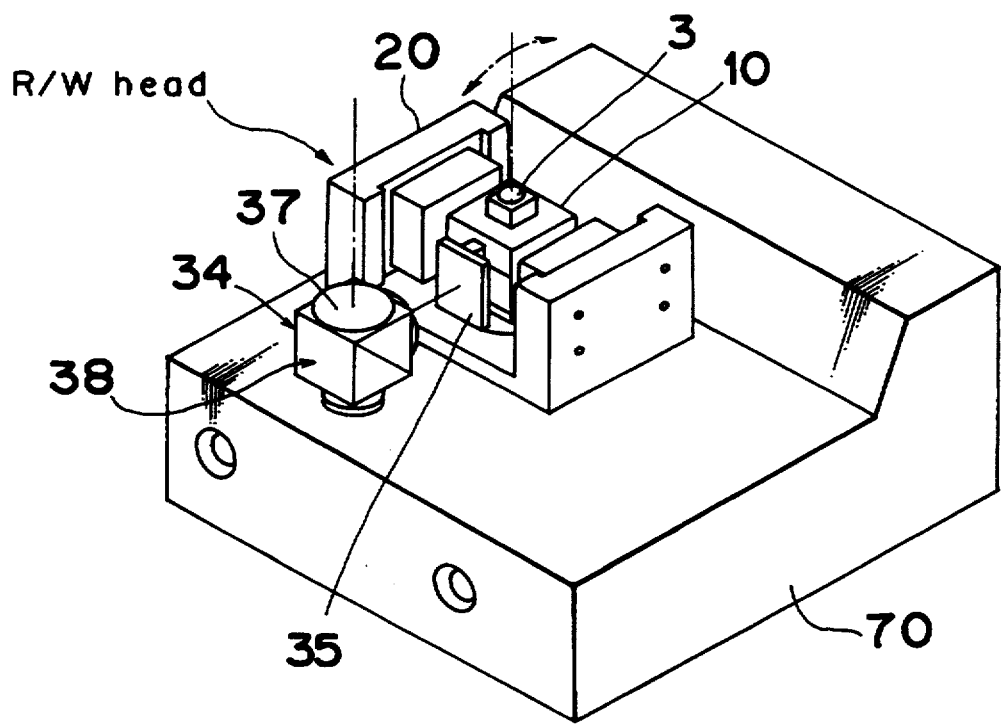
FIG. 15 is a perspective view of an optical reading and writing device according to embodiment 5 of the present invention.

FIG. 15 shows a perspective view of an optical reading and writing head according to embodiment 5 of the present invention which is mounted on a main body frame 70 of an access mechanism (not shown) together with an optical module 34.

Figure 16:
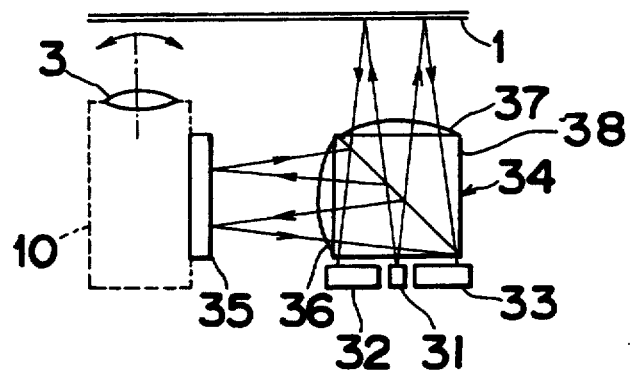
FIGS. 16, 17 and 18 are schematical side views for showing a detection method for detecting a relative tilt between an optical disk and a lens holder using a single tilt sensor according to embodiment 5 of the present invention, respectively.
Figure 17:
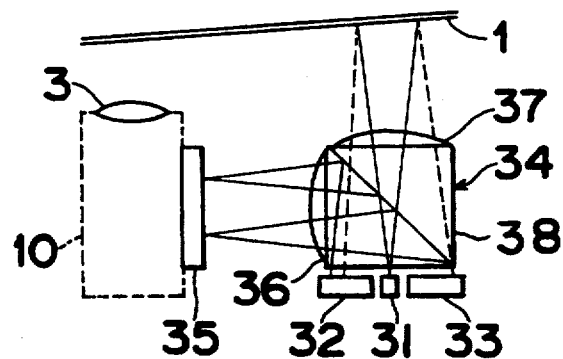
Figure 18:
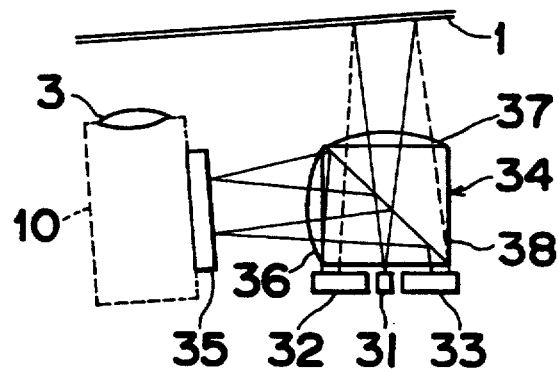

As illustrated in FIGS. 16 to 18, this optical module 34 comprises a light emitting diode 31, a pair of photodiodes 32 and 33 arranged on both sides of light emitting diode 31 in a tilt direction of optical disk 1, a beam splitter 38 having a half-mirror formed on an interface between two triangular prisms, and first and second convex lenses 36 and 37 formed on surfaces of the beam splitter 38 opposing optical disk 1 and a reflection plate 35 supported by lens holder 10, respectively.

Beam splitter 38 splits the light emitted from LED 31 toward optical disk 1 and reflection plate 35 of lens holder 10 and splitted light beams are projected to optical disk 1 and reflection plate 35 through convex lenses 37 and 36, respectively. Lights reflected from optical disk 1 and reflection plate 35 are received, via convex lenses 37, 36 and beam splitter 34.

If optical disk 1 is inclined as shown in FIG. 17, from a horizontal state of optical disk 1 shown in FIG. 16, light amounts received by photodetectors 32 and 33 become different from each other since an amount of the light reflected from optical disk 1 and received by photodetector 32 increases in accordance with a tilt of optical disk 1 while that received by photodetector 33 decreases by the same amount as the increase of the light amount received by photodetector 32. Since lens holder 10 is not tilted in the state shown in FIG. 17, a difference between the light amounts received by photodetectors 32 and 33 indicates a tilt amount of optical disk 1.

As stated regarding embodiment 1, the control circuit generates a control signal in accordance with the difference indicating the tilt amount of optical disk 1 and applies the same to tilt coils (See FIG. 2) of lens holder 10 to tilt lens holder 10 by the same tilt amount as that of optical disk 1, as shown in FIG. 18. When lens holder 10 is tilted so as for the optical axis of objective lens 3 to become perpendicular to optical disk, the difference between the light amounts received by photodetectors 32 and 33 becomes zero since an amount of light reflected from reflection plate 35 and received by photodetector 32 decreases while that received by photodetector 33 increases so as to compensate the decrease of light amount from optical disk 1.

Thus, according to the present embodiment, it becomes possible to detect a relative tilt between optical disk 1 and lens holder 10 using only one tilt sensor (31, 32 and 33).

EMBODIMENT 6

Figure 19:
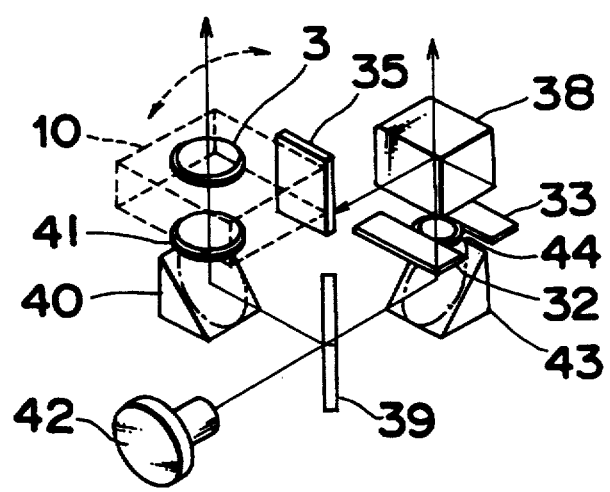
FIG. 19 is a perspective view of an optical system of an optical reading and writing device according to embodiment 6 of the present invention.

FIG. 19 is a perspective view for showing an optical system of an optical reading and writing device in embodiment 6 of the present invention. Objective lens 3, lens holder 10, beam splitter 38, and photodetectors 32 and 33 operate in the same way as in embodiment 5. The difference of this embodiment from embodiment 5 is that in this embodiment a laser diode 42 for use in retrieval of information from optical disk 1 is used in place of a light source for use in detecting tilts of optical disk 1 and lens holder 10. The laser beam emitted from diode laser 42 is split by second half mirror 39 into two beams, one toward objective lens 3, and the other toward beam splitter 38. The beam reflected at a half mirror 39 is reflected again at first mirror 40 and incident on optical disk 1 (not shown) through collimator lens 41 and objective lens 3. The other beam that is transmitted through half mirror 39 is incident on beam splitter 38 through mirror 43 and detection lens 44. Detection lens 44 increases optical transfer efficiency in the same way as first and second lenses 36 and 37 of embodiment 5 do. The beam incident on half mirror 34 is split into two beams, one to optical disk 1 and the other to lens holder 10. These beams are used to detect the tilts of optical disk 1 and lens holder 10 in the same way as in embodiment 5. Component count is reduced by using laser diode 42 for tilt detection, which is mainly used for retrieval of information recorded on optical disk 1.

EMBODIMENT 7

Figure 20:
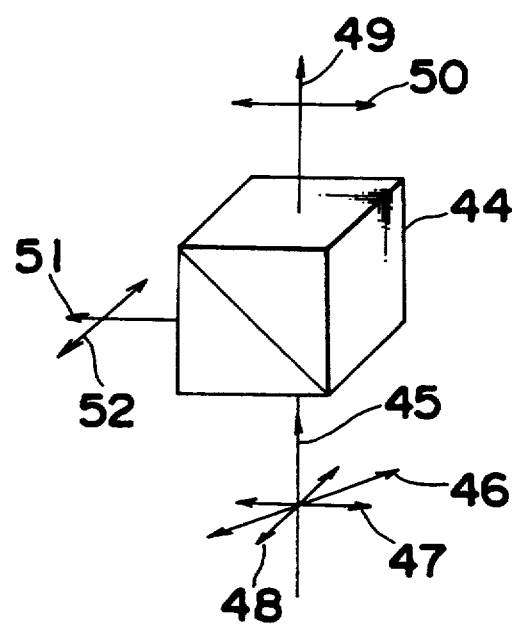
FIG. 20 is an explanatory view of a polarization beam splitter employed in embodiment 7 of the present invention.

Embodiment 7 is realized by replacing beam splitter 38 in FIG. 19 of embodiment 6 with a polarization beam splitter. The operation of embodiment 7 is explained with reference to FIG. 20. Laser beam 45 emitted by laser diode 42 is linearly polarized and incident on a polarization beam splitter 44. The direction of polarization of laser beam 45 which is indicated by arrow 46 in FIG. 20 makes 45 degrees with the principal axis of polarization beam splitter 44. This arrangement is achieved by rotating laser diode 42 in FIG. 19 about its beam axis. The polarization shown by arrow 46 is decomposed into two components of equal intensity, P polarization and S polarization, which are indicated by arrows 47 and 48, respectively.

P polarization component 47 is transmitted through polarization beam splitter 44 and becomes disk beam 49, of which direction of polarization 50 is parallel to arrow 47. Disk beam 49 is incident on the optical disk, reflected maintaining the polarization direction back to polarization beam splitter 44, and incident on the photodetectors.

S polarization component 48 is reflected by polarization beam splitter 44 and becomes objective lens beam 51 and incident on the lens holder. The polarization of objective lens beam 51 is shown by arrow 52, which is parallel to arrow 48. Since the reflected beam from the lens holder maintains the polarization direction, all the beam is reflected by polarization beam splitter 44 and incident on the photodetectors. Accordingly, replacing an ordinary beam splitter with a polarization beam splitter eliminates the loss of light intensity and thus increases light transfer efficiency.

Although embodiment 4 employs bidirectional light source 65 which emits light rays toward both optical disk 1 and lens holder 10, two single-face light sources glued back to back provide the same effect as the bidirectional light source 65 does. Similarly, although double-sided photodetectors 66 and 67 detect the reflected light from optical disk 1 and lens holder 10 with the top and bottom faces, two single-face photodetectors glued back to back provide the same effect as double-sided photodetectors 66 and 67 do. Naturally, combination of a bidirectional light source and single-face photodetectors or combination of a pair of double-sided photodetectors and single-face light sources can be used giving rise to the same effect.

In embodiments 5 and 6 the reflectance of reflector 35 mounted on lens holder 10 is set to be the same as that of optical disk 1. The reflectance of reflector 35, however, may be different from that of optical disk 1. In this case the tilt of optical disk 1 is compensated by tilting movable objective lens holder 10 by an amount a constant factor less than the tilt of optical disk 1 and by making photodetectors 32 and 33 to receive the same light intensities.

First and second lenses 36 and 37 in embodiment 5 and detection lens 44 in embodiments 6 are mounted on the sides of or underneath beam splitter 38. Those lenses are for efficiently utilizing light intensity and can be mounted anywhere around beam splitter 38. One obtains the same effect with some degradation of sensitivity even without using those lenses at all.

In embodiments 6 and 7 the detection lens or the second mirror may be slightly tilted. In this case the outgoing and incoming laser beam axes do not coincide and the reflected light rays from the optical disk and the lens holder do not enter the laser diode for optical information retrieval. This prevents generation of noise on the laser beam used for information retrieval.

EMBODIMENT 8

Figure 21:
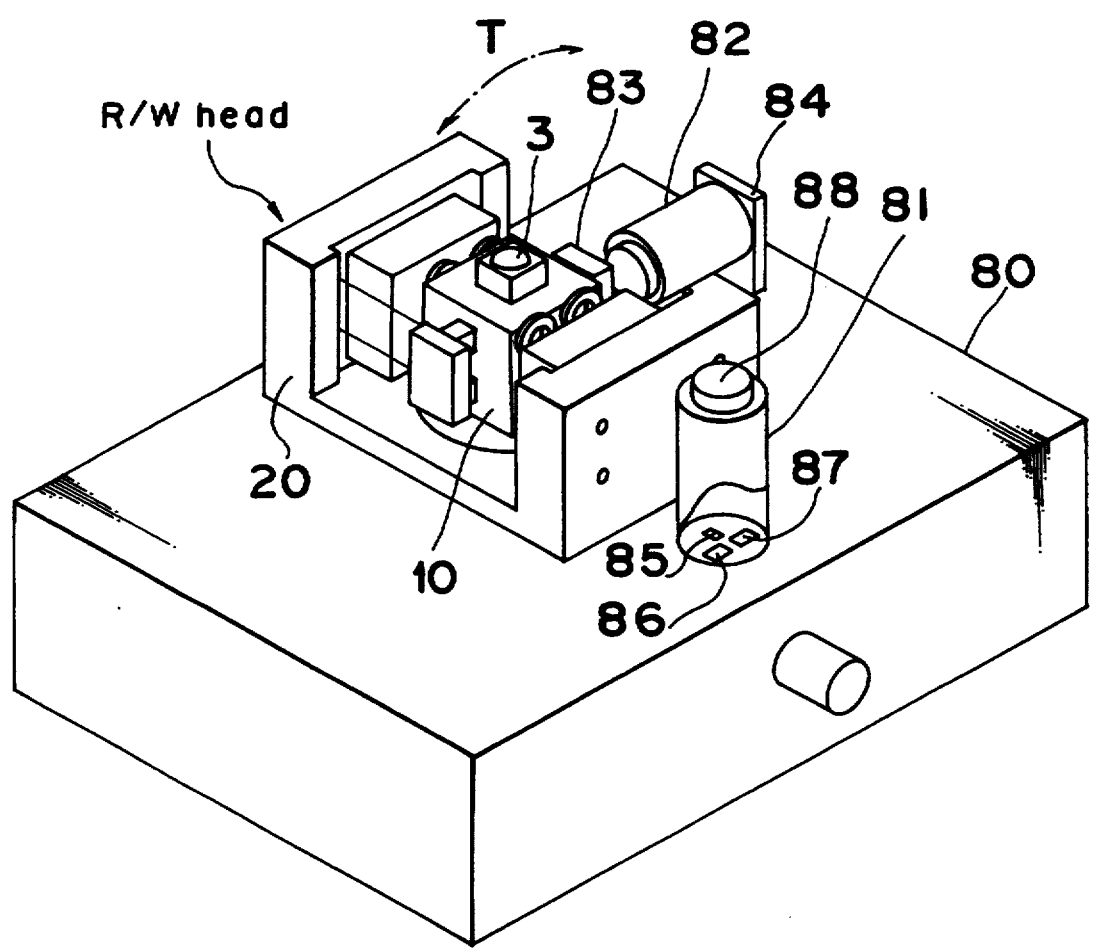
FIG. 21 is a perspective view of an optical reading and writing device according to embodiment 8 of the present invention.

FIG. 21 is a perspective view of an optical reading and writing device according to embodiment 8 of the present invention.

In this embodiment, first and second tilt sensor modules 81 and 82 are mounted on a main body frame 80. The first tilt sensor module 81 is provided for detecting a tilt of an optical disk (not shown) and the second one 82 is fixed to a support plate 84 rising vertically from main body frame 80 and is directed toward a reflection plate 83 supported by lens holder 10 to detect a tilt of lens holder 10.

As illustrated with respect to the first tilt sensor module 81, each of first and second sensor modules 81 and 82 has a light emitting diode 85 and a pair of photodiodes 86 and 87 at the bottom of a cylindrical casing and a projection lens 88 at the top thereof.

A difference between output signals of first and second tilt sensor modules 81 and 82 indicates a relative tilt between optical disk and lens holder 10 and lens holder 10 is controlled to follow a tilt of optical disk 1 by controlling a drive current for tilt coils so that the difference between output signals of first and second tilt sensor modules 81 and 82 becomes zero.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An optical reading and writing head of an optical disk apparatus for reading information written on an optical disk and writing information thereonto, comprising
    an objective lens;
    a mount member fixedly mounted on a main body of said optical disk apparatus;
    a lens holder for holding said objective lens;
    a support means for displacing said lens holder in a direction of the optical axis of said objective lens and tilting the same in a plane including the optical axis of said objective lens relatively to said mount member;
    a first tilt sensor means for detecting a tilt of said optical disk relative to said mount member;
    a second tilt sensor means for detecting a tilt of said lens holder relative to said mount member; and
    a control means for performing a tilt control of said lens holder by controlling said support means in accordance with output signals of said first and second tilt sensor means;
    wherein said first and second tilt sensor means are arranged on said mount member.

2. The optical reading and writing head according to claim 1, in which each of said first and second tilt sensor means is comprised of a light emitting device for projecting a light toward a target being either one of said optical disk and lens holder and a pair of light receiving devices arranged apart from each other in a direction capable of detecting a tilt of said target to receive reflected light from said target.

3. The optical reading and writing head according to claim 2, in which said lens holder provides a reflection means for reflecting the light from said light emitting device.

4. The optical reading and writing head according to claim 3, in which the reflectance of said reflection means is different from that of said optical disk.

5. The optical reading and writing head according to claim 1, in which said first and second tilt sensor means have a common light emitting device and a beam splitter for splitting a light emitted from said common light emitting device toward said optical disk and said lens holder, respectively, wherein the light reflected by said optical disk and that reflected by said reflection means are cancelled with each other by reflection and transmission operation by said beam splitter.

6. The optical reading and writing head according to claim 5, in which said beam splitter is comprised of a polarization beam splitter which decomposes a linearly polarized light into P and S polarization components.

7. The optical reading and writing head according to claim 5, in which each of said first and second tilt sensor means has a pair of light receiving devices arranged apart from each other in a direction capable of detecting a tilt of said optical disk or said lens holder.

8. The optical reading and writing head according to claim 1 in which said first and second tilt sensor means are arranged at different positions of said mount member.

9. The optical reading and writing head according to claim 1 in which said first and second tilt sensor means are arranged at the same position of said mount member.

10. The optical reading and writing head according to claim 9 in which first and second tilt sensor means are comprised of a double side light emitting device for emitting light toward said optical disk and said lens holder, respectively, and a double side light receiving device having a pair of light receiving devices on both sides thereof, said pair of light receiving devices being arranged apart from each other in a direction capable of detecting a tilt of said optical disk or lens holder.

11. The optical reading and writing head according to claim 1 in which said control means controls the tilt of said lens holder in accordance with a difference between output signals from said first and second tilt sensor means.

* * * * *